May 6, 1941.    M. BRIGGS    2,240,755
POWER TOOL
Filed Sept. 7, 1937
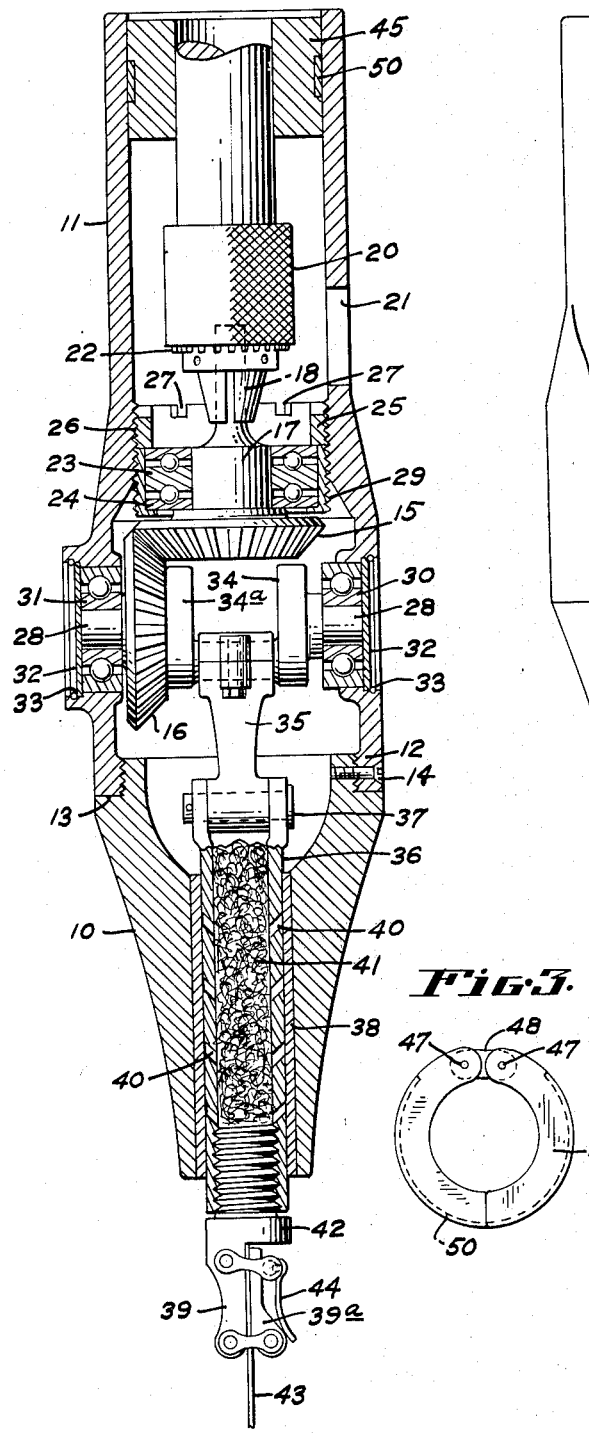
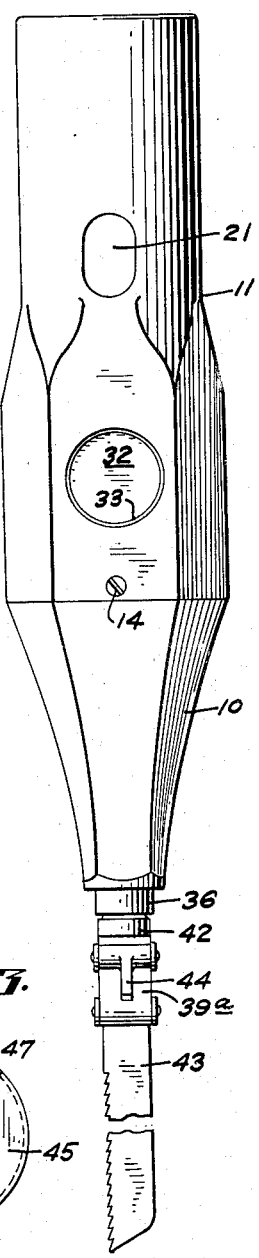
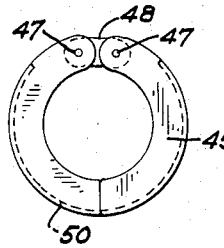
INVENTOR.
MARTIN BRIGGS
BY Owen and Hardy
ATTORNEYS.

Patented May 6, 1941

2,240,755

UNITED STATES PATENT OFFICE 2,240,755

POWER TOOL

Martin Briggs, Oakland, Calif.

Application September 7, 1937, Serial No. 162,770

3 Claims. (Cl. 29—73)

This invention relates in general to power tools and particularly to a device which may be used as an attachment to existing power tools having rotary motion.

There has long been a demonstrated need for a relatively small, handy and efficient power tool having reciprocating movement for sawing, filing or the like which is portable and will operate in inconvenient places, and one of the objects of the present invention is to provide a tool to meet the need successfully.

Among other objects of the present invention is to provide a tool into which saw blades or portions thereof may be fitted and which is adapted for attachment either to a standard one-quarter (¼) or five-sixteenths ($\frac{5}{16}$) inch electric drill, as well as being adapted to be driven by power from a flexible shaft. Obviously this tool may be adapted for any size drill or any size chuck and the sizes stated are by way of examples only.

Another object is to provide a power tool which is small enough to be carried in a kit for use on the job and which is powerful enough to cut any material which a workman may find in his day's work.

Another object is to provide a tool which is small enough and adaptable enough to operate in reaching inconvenient places which would otherwise be inaccessible for a hacksaw or carpenter's saw and where the ordinary keyhole saw would likewise be useless.

An object of this invention is the provision of a tool of the kind described which renders the ordinary electric drill a multipurpose tool.

It is also an object of this invention to provide a tool of this nature which is at the same time an "in-line" tool whereby it is possible for the operator to see precisely the line for cutting or filing or any operation thereof, and thereby guide or direct the course of the operation.

Another object of this invention is the provision of a tool having the characteristics and capacities herein disclosed which may be turned on its axis during operation and so provide the benefits of jigsaw cutting, for example, to a portable tool.

It is also an object of the present invention to provide a hand tool in which, although operating at the high speed characteristic of hand drills and drill presses, there is smooth, substantially vibrationless operation without harmful or otherwise uncomfortable manipulation by the worker.

It is a further object of the present invention to provide a tool for reciprocatory movement adaptable for attachment to a power hand drill or drill press which can be attached or detached with no more effort or loss of time than that which an operator is now required to take in order to change the drill size.

Further objects are to provide a construction of maximum simplicity, economy, and ease of assembly, and such further objects, advantages and capabilities as will fully appear and as are inherently possessed thereby.

This invention further resides in the combination, construction and arrangement of parts illustrated in the accompanying single sheet of drawings and while there is shown therein a preferred embodiment, it is to be understood that the invention is capable of modification and change and comprehends other details and constructions without departing from the spirit and the scope of the invention.

Referring to the drawing:

Fig. 1 is a vertical section of the complete power tool showing also the manner of attachment to the chuck of a power drill.

Fig. 2 is an elevational view of the detached unit.

Fig. 3 is a plan view of a split ring adapter.

Like reference characters are used to designate similar parts in the several views of the drawing and the description of the invention herein.

Referring more particularly to the drawing disclosing the preferred embodiment, the tool housing is made in two parts, the plunger body housing 10, and the main drive housing 11. The plunger body housing is provided with a threaded inner annular flange 12 which forms a shoulder to receive the threaded outer annular portion 13 at one end of the main drive housing and both fit in flush engagement. The two parts of the housing are locked in position by screw 14. Inside of the main drive housing 11 are positioned a pair of bevel gears 15 and 16. Gear 15 is attached to gear hub 17 which has an extension shaft 18 of lesser diameter and adapted to be received by a drill chuck 20 or any other suitable connection for rotary power drive such as for example, power from a flexible shaft. An opening 21 is provided in the main drive housing to accommodate a drill chuck wrench for engagement with teeth 22 for tightening the grip of the chuck 20 to the shaft 18.

Gear hub 17 is mounted for rotary movement inside of the main drive housing on a double set of ball bearings 23 and 24, the bearing cup 29 being threaded for engagement with threads on the inside of the main drive housing at 26. On the outward side of the ball bearings 23 is a collar member 25 likewise threaded on the outer surface for engagement with threads provided on the inner surface of the main drive housing at 26. It may be locked in position in any suitable manner such as a set screw or the like. This collar member 25 is provided with notches 27 which are adapted to receive the lugs of a suitable wrench. This is particularly provided as a readily accessible means for tightening the meshing of gears 15 and 16.

Gear 16 is mounted on crank shaft 28 which is journaled in bosses in the side walls of the main drive housing with suitable ball bearings 30 and 31. It will be seen from the figures herein that the median portion of the tool is enlarged and also changes from cylindrical to preferably hexagonal form. A suitable cover plate 32 is provided on the outside for the bearings 30 and 31 and for the ends of crank shaft 28 which cover plates are held in place by snap rings 33. The crank shaft 28 is precisely counterbalanced by counterbalancing weights 34 and 34a. Between the counterbalancing weights one end of a connecting rod 35 is removably secured to the crank shaft 28 and at the other end is secured to the plunger 36 by a wristpin 37. In the plunger body housing 10 which is tapering in shape there is a suitable axial opening provided with a bushing 38 to accommodate the plunger 36 in free movement but without play or side slap. The plunger 36 is preferably a hollow tube with numerous slanting perforations 40 therethrough and is packed with felt 41 or any other suitable material impregnated with oil or other lubricating media. In this manner self-lubrication of the plunger is accomplished. Mounted in the free end of the plunger 36 in any suitable manner is a chuck 42 for holding in tight engagement a saw blade 43 or portion of it or file or any other tool suitable for reciprocating movement.

In Fig. 3 there is shown a split ring adapter 45 which is a collar preferably of metal adapted to encircle the outer chuck bearing cylinder of the standard drill. The collar is split in half and suitably hinged as by pins 47 and links 48. A spring clamp 50, set in a recess on the outer face of the adapter holds the member in place. The outer face is made even and with no projections because it is adapted to slide into the power receiving end of the tool. This adapter is used particularly when bearings of the power drill are loose or wabbly, to hold the drill chuck and the tool from gyratory movement.

The operation of the device is remarkably simple. All that is necessary to fit the tool for immediate action is to provide some source of power which can be either a flexible shaft or a power drill chuck 20 and in any case all that is required is to fit the shaft 18 into the space ordinarily provided for a drill or other tool. The entire operation is quite co-extensive with the ease of inserting the drill bit. The rotary movement is transmitted to the bevel gear 15 and thence to the bevel gear 16 which turns the crank shaft 28, operating the plunger 36 in rapid reciprocatory movement. The chuck 42 shown in the drawing is adapted to receive a saw blade which is held in place by the pressure of the cam action of the grippers 39 and 39a which is compounded by an eccentric cam latch 44. The length of the blade is largely governed by the size and the kind of material to be cut.

If the tool is attached to a standard electric drill provided with the customary pistol grip, the operator controls the drill with his right hand precisely in the same manner as he uses the electric drill. His left hand holds the attachment of the invention preferably at a point near where the main drive housing joins the plunger body housing, thus making it an easy tool to handle because of its balance. The ease of handling and the convenience of the tool is further increased by the fact that as the device is operated it may be turned or rotated to saw in the direction of the desired cut without changing or disturbing the normal and customary pistol grip of the operator's right hand. This is of invaluable use in getting to obscure and difficult places. Further, the power supplied and the tool itself is of sufficient strength to accomplish very difficult tasks and to accomplish other tasks which were hitherto thought to be impossible of execution by a cutting tool of this nature. For example, on actual work this tool has cut out openings in the side of stucco buildings in one operation which includes a thickness of stucco siding, metal lath, nails, wood and such things, without any hesitation. Furthermore, it is possible by means of this tool to cut gussets or circular contours and metal tubing. Also the speed and the power involved is sufficient to cut a metal of substantial thickness as well as wood, rubber and a wide variety of other materials.

One application of the invention is further illustrated in the meat packing industry where in dividing the carcasses of slaughtered animals into parts it is necessary to cut down through the backbone. By means of this saw it is now possible to do this quickly and efficiently by means of unskilled help whereas heretofore only skilled, accurate workmen could be used to do this task with a vicious two-handed meat cleaver. Also, in eliminating this, a serious industrial mental hazard is overcome, as the men employed to do this particular work often become temporarily mentally vicious from fatigue.

Although most of the operations herein have been described in connection with the portability of this tool, it is equally adapted for use as an attachment on the stationary drill press and converts the drill press into a tool with jig saw potentialities. Also, it is apparent that the device may be attached to a motor in a form similar to a power drill in permanent attachment, thus making a portable tool without the drill feature. The modification requires no substantial change and is included within the contemplation and scope of the present invention.

I claim:

1. A reciprocating power tool energizable from a chuck driven by a source of rotary power comprising a handle formed to fit said rotary power source independently of rotation thereof, a spindle rotatably mounted within said handle to engage said chuck, a bevel gear fixed to said spindle, a second bevel gear disposed axially normal to and engaging said bevel gear, anti-friction bearings supporting said bevel gears, a link eccentrically connected to said second bevel gear, a hollow plunger pivotally connected to said link, said plunger slidably positioned within said handle and extending outwardly therefrom, apertures disposed through said hollow plunger, means disposed within said plunger for lubricating the external surface of said plunger through said apertures, and means associated with said plunger externally of said handle for engaging a working member.

2. A reciprocating power tool energizable from a chuck driven by a source of rotary power comprising a handle formed to fit said rotary power source independently of rotation thereof, a spindle rotatably mounted within said handle to engage said chuck, a bevel gear fixed to said spindle, a second bevel gear disposed axially normal to and engaging said bevel gear, anti-friction bearings supporting said bevel gears, a link eccentrically connected to said second bevel gear, a hollow plunger pivotally connected to said link, said plunger slidably positioned within said handle and extending outwardly therefrom, apertures disposed through said hollow plunger, means disposed within said plunger for lubricating the external surface of said plunger through said apertures, means associated with said plunger externally of said handle for engaging a working member, and anti-friction thrust bearings threadably positioned within said handle to provide support for said spindle and bevel gear, and an adjustable collar threadably positioned within said handle and engaging said anti-friction thrust bearings, whereby the position of said bevel gear relative to the position of said second bevel gear may be adjusted.

3. A reciprocating power tool energizable from a chuck driven by a source of rotary power comprising a handle formed to fit said rotary power source independently of rotation thereof but having a bearing thereon, a spindle rotatably mounted within said handle to engage said chuck, a bevel gear fixed to said spindle, a second bevel gear disposed axially normal to and engaging said bevel gear, a link eccentrically connected to said bevel gear, a plunger pivotally connected to said link, said plunger slidably positioned within said handle and extending outwardly therefrom, and means associated with said plunger externally of said handle for engaging a working member.

MARTIN BRIGGS.